United States Patent [19]

Deleris

[11] 4,366,792
[45] Jan. 4, 1983

[54] ANGLE OF ADVANCE CORRECTION SIGNAL GENERATOR

[75] Inventor: Robert Deleris, Bailly, France

[73] Assignee: Regie Nationale des Usines Renault, Boulogne Billancourt, France

[21] Appl. No.: 202,075

[22] Filed: Oct. 30, 1980

[51] Int. Cl.³ .............................................. F02D 11/10
[52] U.S. Cl. ................................... 123/425; 123/435; 73/35
[58] Field of Search .................... 73/35; 123/425, 419, 123/435, 436

[56] References Cited

U.S. PATENT DOCUMENTS 4,274,379 6/1981 Iwata ................................... 123/425
4,300,503 11/1981 Deleris ................................ 123/425
4,322,800 3/1982 Hisegawa ............................. 123/419

Primary Examiner—Ronald B. Cox
Attorney, Agent, or Firm—Oblon, Fisher, Spivak, McClelland & Maier

[57] ABSTRACT

An angle of advance correction signal generator responsive to the presence of ping signals produced in a controlled ignition internal combustion heat engine of the type in which a pre-ping threshhold and a ping threshhold is determined and a pre-ping signal and a ping signal is produced in the event that a pre-pinging or a pinging condition is detected exceeding respective of said threshholds, wherein said pre-ping signal and said ping signal are produced for each cylinder of the engine taken successively in predetermined order. The generator includes a multiplexor for applying pre-ping and ping signals to respective processing circuits provided for respective cylinders. In the processing circuits predetermined numerical values are loaded into respective pre-ping and ping numerical counters, which are then decremented upon the occurrence of predetermined multiples of engine rotations. The pre-ping and ping counter outputs corresponding to each cylinder are added by an adder having an output indicative of advance angle, which is applied to an output stage for control of the advance of the respective engine cylinder.

13 Claims, 4 Drawing Figures

ANGLE OF ADVANCE CORRECTION SIGNAL GENERATOR

BACKGROUND OF THE INVENTION

1. Field of the Invention

This invention relates to an angle of advance correction signal generator responsive to the effect of pinging in a controlled ignition internal combustion engine.

2. Description of the Prior Art and Related Patent Applications

In the course of developing a new gasoline engine, consideration of the pinging phenomenon has become a habitual phase of the motor mechanic's work. Precise experiments enable him to select a compression rate that yields a good compromise among the following parameters: lack of pinging, specific torque value, efficiency, choice of fuel, with consideration of the precision of the advance devices available to him. With advance-angle generation devices consisting of moving mechanic parts, the motor mechanic provides for an advance angle reaching maximum specific torque and/or with a ping clearance on the order of eight degrees. This limit can become disadvantageous in engines where the ping limit is close to or ahead of the optimum advance.

Various tests have shown that this clearance can be reduced by means of adding simple angle unkeying or decrementing devices such as switching according to the engine water temperature or the air temperature in the intake manifold, to means giving the ignition instant, for example by switching the signals delivered by a distributor with two electromagnetic pick-ups or with unkeyed Hall effect to give a translation of the advance system. However, these devices may be satisfactory for certain operating points but are ill-suited for the law of advance and do not make it possible to have an ignition point at the optimum moment for the engine. It is therefore appropriate to bring about unkeying only when this is necessary, and in order to make the engine work under optimum conditions. At present, the technician can design or utilize electronic ignitions with advance cartograpy preprogrammed according to the various values for engine rotation speeds and/or the vacuum in the intake manifold, and thus provide for an advance law closer to the engine's optimum efficiency values. It will be easy for him to adopt the device described hereinafter to unkey the ignition point so as not to cause pinging.

The most effective method for ping detection is analysis of the pressure in the engine's combustion chamber. This method requires expensive transducers. Therefore, a preferred approach involves an analysis of the vibrations of the engine's cylinder head by means of vibration transducers, for example of the seismic type. Analysis of the vibrations, both in frequency and amplitude, of half a revolution shows different phases of excitation, in particular the noise due to combustion and activation of the intake and exhaust values. The combustion phase starting at the moment of ignition only presents characteristic ping signal points in the vicinity of the engine's maximum pressure; therefore it is appropriate to examine the signal from the vibration pick-up throughout the maximum pressure phase.

Ordinarily, an angular window is created linked in rotation to the crankshaft and making it possible to record the signals relative to the combustion noise only at the time of this phase. The combustion noise is a function of the rotation speed, the angle of advance, the vacuum in the intake manifold, and the type of fuel used. Incorporating this noise into the angular window is a key element well known to the technician called on to deal with these subjects and makes it possible to increase the dynamics of the signal. The noise grows with the engine speed; incorporation of this noise for a varying period of time, inverse to the engine speed, reduces the interactions due to the variations in level caused by a variation in speed. Nonetheless, this solution is only sufficient for rather low engine speeds; subsequently the incorporated value increases with the engine speed; it is therefore necessary to work at a relative level by individualizing the values given for each cylinder.

A description of a ping detection system based on this principle will be found in commonly owned U.S. patent application Ser. No. 141,147 filed Apr. 17, 1980 for a "Process and System for Computation and Adjustment of now U.S. Pat. No. 4,300,503 Optimum Ignition Advance," which is hereby cross referenced.

In patent application Ser. No. 141,147, an initial process is disclosed calculating and adjusting the advance optimization of an internal combustion engine by means of a system for detection of pinging with the aid of a window such as an accelerometer rigidly attached to the engine's cylinder head characterized by the fact that the accelerometric signal is made to undergo an analog treatment including, in particular, integration of the signal inside a given window; conversion of the resulting signal into numerical form; calculation of an average value proportional to the preceding n pings; calculation of two thresholds of comparison $S_1$ and $S_2$, each of which is a linear function of the previously calculated average value; and comparison of the numerically incorporated accelerometric value to each of these thresholds, whereupon the existence or absence of a pre-pinging value and/or an audible ping value is deducted which is then used to act on the programmed electronic ignition advance.

Additionally, a system is there disclosed for calculating and adjusting the advance optimization of an internal combustion engine by means of a ping detection system consisting of a transducer such as an accelerometer rigidly attached to the engine's cylinder head, characterized by means for analog treatment of the signal picked up from the accelerometer 10, including in particular integrator logic circuits for controlling the integrator, an analogical-digital converter, and a microcomputer including in particular a sequencer, a stage for calculating an average value proportional to the preceding n pings, two stages for calculating comparision thresholds $S_1$, $S_2$, each of which is a linear function of the previously calculated average value, and circuits for deducing therefrom the existence or absence of a pre-ping value and/or audible pings.

The aforementioned patent application thus makes it possible to produce two detection thresholds, one called a pre-ping threshold and the other a ping threshold, detecting incorporated value levels greater than those of the pre-ping threshold.

Assuming that these prior signals have been demonstrated and are available, the present invention proposes a system for correcting the angle of advance capable of making use of the pre-ping and ping signals which have been brought to light by the process and system described in the aforementioned patent.

SUMMARY OF THE INVENTION

Accordingly, one object to this invention is to provide a novel advance angle correction signal generator responsive to the effect of ping signals for a controlled ignition internal combustion engine of the type including means for providing for each cylinder in the engine taken successively in a predetermined order two detection thresholds, one called a pre-ping threshold signal and the other called a ping threshold signal, and means for producing pre-ping and ping signals when the respective thresholds are exceeded. The pre-ping and ping signals appear on respective input conductors connected to a multiplexor which receives said pre-ping and ping signals, as well as a third input from a cylinder meter receiving a correction signal at a first resetting input and T.D.C. and B.D.C. impulses through a second input. The multiplexor includes as many pairs of outputs as the engine has cylinders. Each multiplexor output is connected to a respective calculator of the value of an unkeying or decrementing advance angle according to the state of the cylinder meter taken after resynchronization by a T.D.C. and B.D.C. impulse signal.

According to a first embodiment, the calculator of the decrementing value of the angle of advance includes a first circuit relating to the processing of the pre-ping signal and a second circuit relating to the processing of the ping signal, these two circuits being identical to one another and each including: a storage register for storing an initial angle value relative to the cylinder in question; a numerical counter; a status detector and a programmable divider. The status detector of each circuit is connected to a common adder having an output coupled to an output stage. In each circuit, the numerical counter has a preset or loading input connected either to the pre-ping signal or to the ping signal as the case may be, and a decrementing input coupled to the corresponding programmable divider. Advantageously, each numerical counter is coupled by its decrementing input its corresponding programmable divider through a logical gate which has another input connected to the corresponding status detector.

According to an alternative implementation, either each calculator of the value of the decrementing angle relative to a given cylinder is followed by an outlet stage, or all the calculators are connected to a signal output stage through a second multiplexor.

According to a first implementation, each output stage is a parallel/series transformation stage which includes the connection in series of a memory, a numerical counter, and a status detector the output of which is applied to a first input of a third logical AND gate, the second input of which is connected to a conductor carrying clock signals, which conductor is also connected to the unloading input of the numerical counter. According to a preferred implementation, each output stage is reduced to the presence of a simple memory.

The realization described, being adapted to a four-cylinder engine, can easily be extended to an engine with a different number of cylinders.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
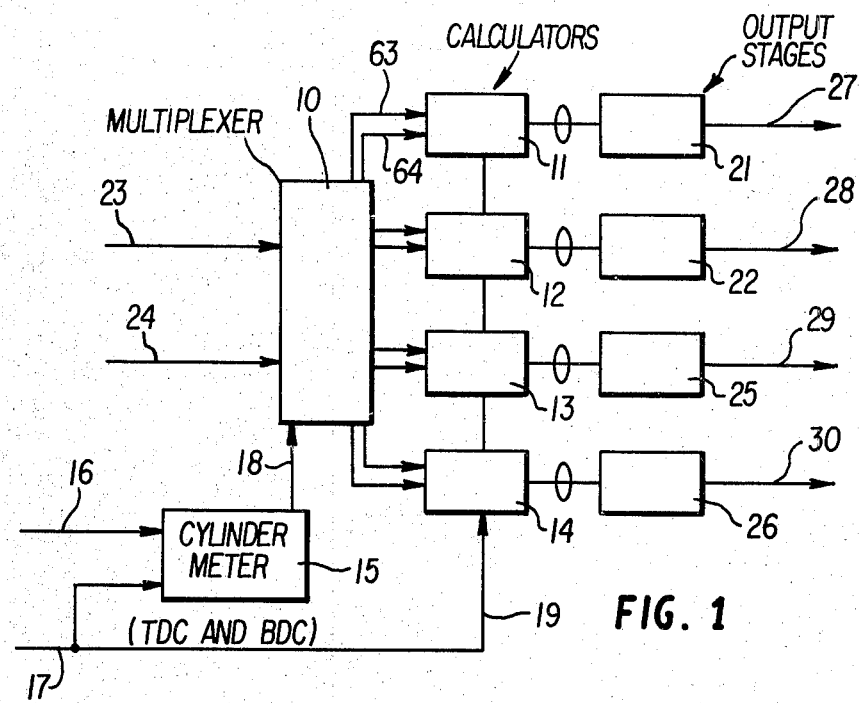
FIG. 1 is a block diagram of one embodiment of the correction signal generator according to the invention.

Referring now to the drawings, wherein like reference numeral designate identical or corresponding parts throughout the several views, and more particularly to FIG. 1 thereof, the data delivered by a ping detector, for example such as that described in the aforementioned patent application, Ser. No. 141,147, appear on an input 23 for the pre-ping signal and on an input 24 for the ping signal for a multiplexor 10. This multiplexor 10, the role of which is to shunt the signals from inputs 23 and 24 onto each of the elementary calculators 11 to 14, includes twice as many outputs as the number of cylinders in the engine. The elementary decrementing calculators 11 to 14 are connected respectively to output stages 21, 22, 25, 26, the role of which is to transmit via outputs 27 to 30 the advance decrementing value to the general advance calculator associated with the error signal generator according to the present invention. A cylinder meter 15 receives at its input 16 a correction signal delivered for example following detection of a spark current in a plug or detection of a mark on the camshalft as it well known by the technician. This signal is a resynchronization signal. The cylinder meter 15 in addition receives through its second input 17 impulse detection signals corresponding to the top dead center (T.D.C.) and the bottom dead center (B.D.C.). The input 17 is the clock input for the cylinder meter 15. The T.D.C. and B.D.C. impulse signals are also received by the decrementing value calculators 11 to 14 of each cylinder via a conductor 19. The cylinder meter 15 is connected by its output 18 as control input to the multiplexor 10. The decrementing value calculators 11 to 14 are all of the same type and deliver at their output a decrementing angle value for the corresponding cylinder, which value is established through activation of the pre-ping 23 and/or ping 24 inputs and the number of ignitions. Subsequently, with the aid of FIG. 3, it will be explained how said calculators are realized.

Figure 2:
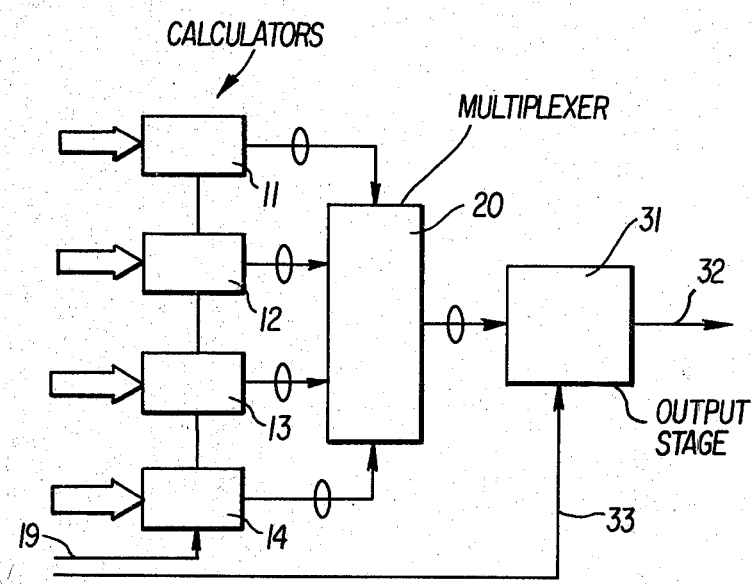
FIG. 2 is a block diagram of an alternative implementation of the output stage.

FIG. 2 illustrates another embodiment of the correction signal generator of FIG. 1 in that the outputs of the generators 11 to 14 of decrementing values for each cylinder are connecting to output multiplexor 20 connected by its output to a single output stage 31 receiving through its input 33 the shunting signals 18 present at the output of the cylinder meter 15. The output 32 of the output stage 31 is connected to the advance calculator which utilizes the data from the output line 32 in a predetermined order, which is perfectly conceivable since this is a sequential system.

Figure 3:
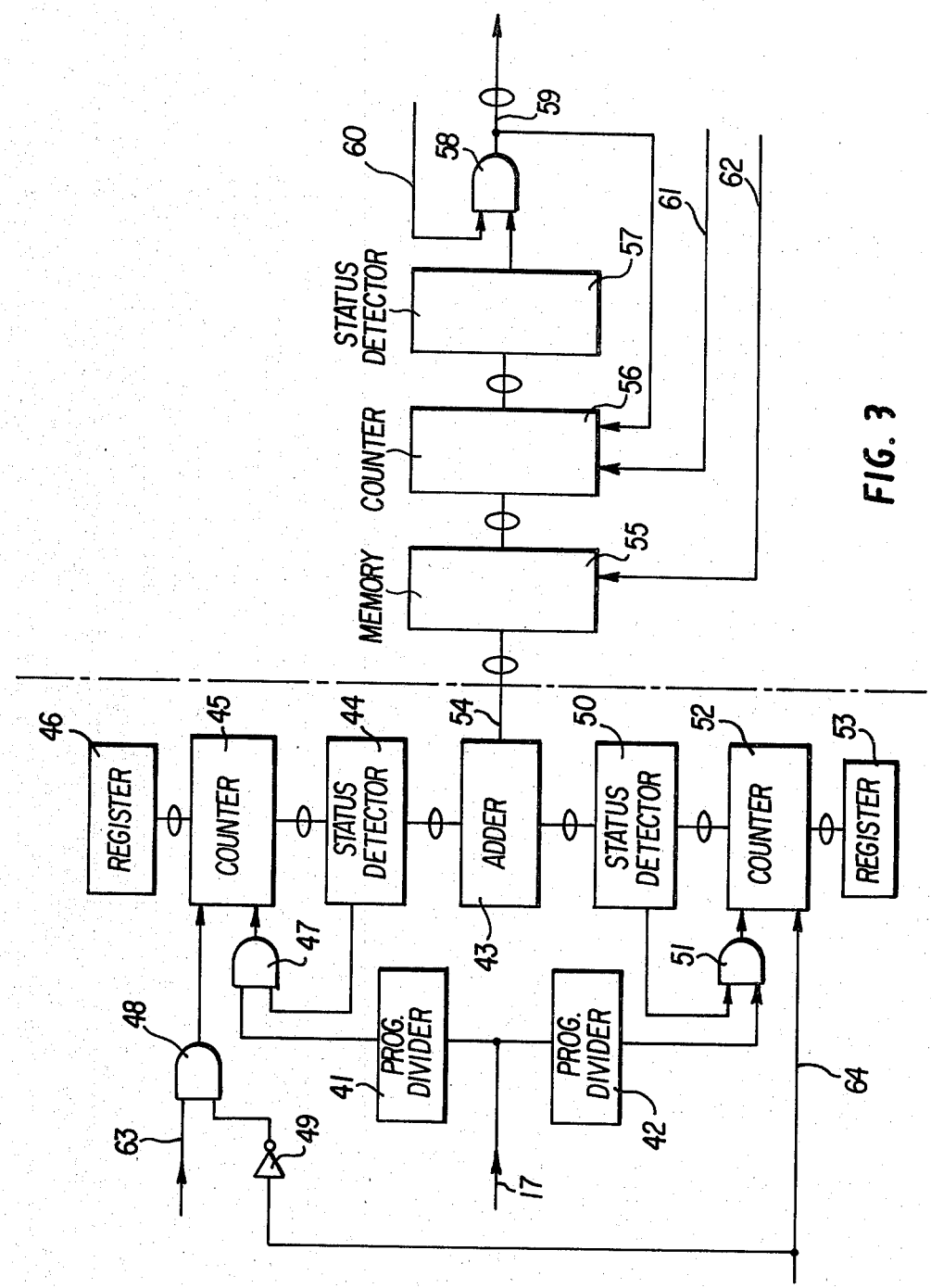
FIG. 3 is a block diagram of the decrementing calculator provided in connection with each of the vehicle's cylinder and an output stage.

FIGS. 3 illustrates a detailed circuit implementation in block diagram form of each of the calculators 11 to 14 appearing in the preceding figures, as well as each of the output stages 21, 22, 25, 26 and 31 of the preceding figures. On the left side of FIG. 3, conductors 63, 64 are recognized as an output pair of pre-ping and ping signals from the multiplexor corresponding to a respective cylinder. Conductor 17 likewise already introduced in FIG. 1, is recalled as providing the T.D.C. and B.D.C. impulse signals. The T.D.C. and B.D.C. impulse conductor 17 is connected to two programmable dividers 41 and 42 assigned to pre-ping and ping processing, respectively. Generally speaking, the calculator's architecture is symmetrical and includes identical circuits assigned to processing pre-ping and ping respectively, and which both provide inputs to a common adder 43. The calculator circuit assigned to process the pre-ping signal coming from the input conductor 23 includes a storage register 46 for inital decrement values connected to a status detector 44. The status detector 44 is in addition connected to the numerical counter 45 through a first logical AND gate 48 having a first input connected to the pre-ping signal conductor 63 and a second input connected the ping signal conductor 64 through a logical inverter 49.

Analogously, the calculator circuit assigned to process the ping signal includes a storage register 53 for storing the initial decrement value for the cylinder in question, which is connected to a numerical counter 52. Counter 52 is coupled to the output adder 43 through a status detector 50. The status detector 50 is in addition connected to the numerical counter 52 through a third logical AND gate 51, the second input of which is connected to the output of the programmable divider 42.

The loading input of the numerical counter 52 is directly connected to the input 24 supplying the ping signals. The output 54 of the adder 43 is connected to an output stage consisting of the connection in series of a memory 55, a numerical counter 56, and a status detector 57. The output of the status detector 57 is connected to an input of a logical AND gate 58 having an output 59. The AND gate 58 is connected by a second input to a conductor carrying the speed clock signals 60, and the conductor 59 is also connected to the counting input of the numerical counter 56. A conductor 61 is connected to the "loading" input of the numerical counter 56 and a conductor 62 is connected to an input of the memory 55 to cause the latter to begin functioning. The calculator illustrated in FIG. 3 thus includes two programmable numerical counters 45 and 52 which are preset to the m state by the pre-ping 63 and ping 64 impulses, and which are connected to a common adder 43. The counter 45 and 52 are decremented by means of the programmable dividers 41 and 42 every n T.D.C. and B.D.C. impluses. The m values relative to the two counters may be different; they depend on the strategy for regulating the angle advance value. The value of m relative to the pre-ping circuit is low, e.g. between one and four, and conditions the regulating, while the value of m relative to the ping circuit is relatively high, e.g., between six and ten and conditions protection of the engine against severe pinging. Likewise, the values of n coming out of the programmable dividers 41 and 42 and introduced into the numerical counters 45, 52 are generally different and condition the regulation. The value of n for the pre-ping circuit is selected high, between 1,000 and 2,000 T.D.C. and B.D.C. impulses, while the value of n selected for the ping circuit is low, e.g., between 200 and 400 T.D.C. and B.D.C. impulses bringing about a fast return so as not to penalize the engine too much on strong pings detected in the transitory phases such as during accelerations or changes in speed. The adder 43 algebraically adds the values of the two decremented calculated values. It is connected to the output stage by the conductor 54. The output stage 55-62 is a parallel/series transformation stage. Depending on the technology of the calculator coupled to the device, it may be that this stage becomes unnecessary. In this case, the output stage is reduced to the memory block. The implementation illustrated in FIG. 3 applies to the case of FIG. 2 if the output multiplexor 20 on the conductor 54 is interposed between the adder 43 and the memory 55.

Figure 4:
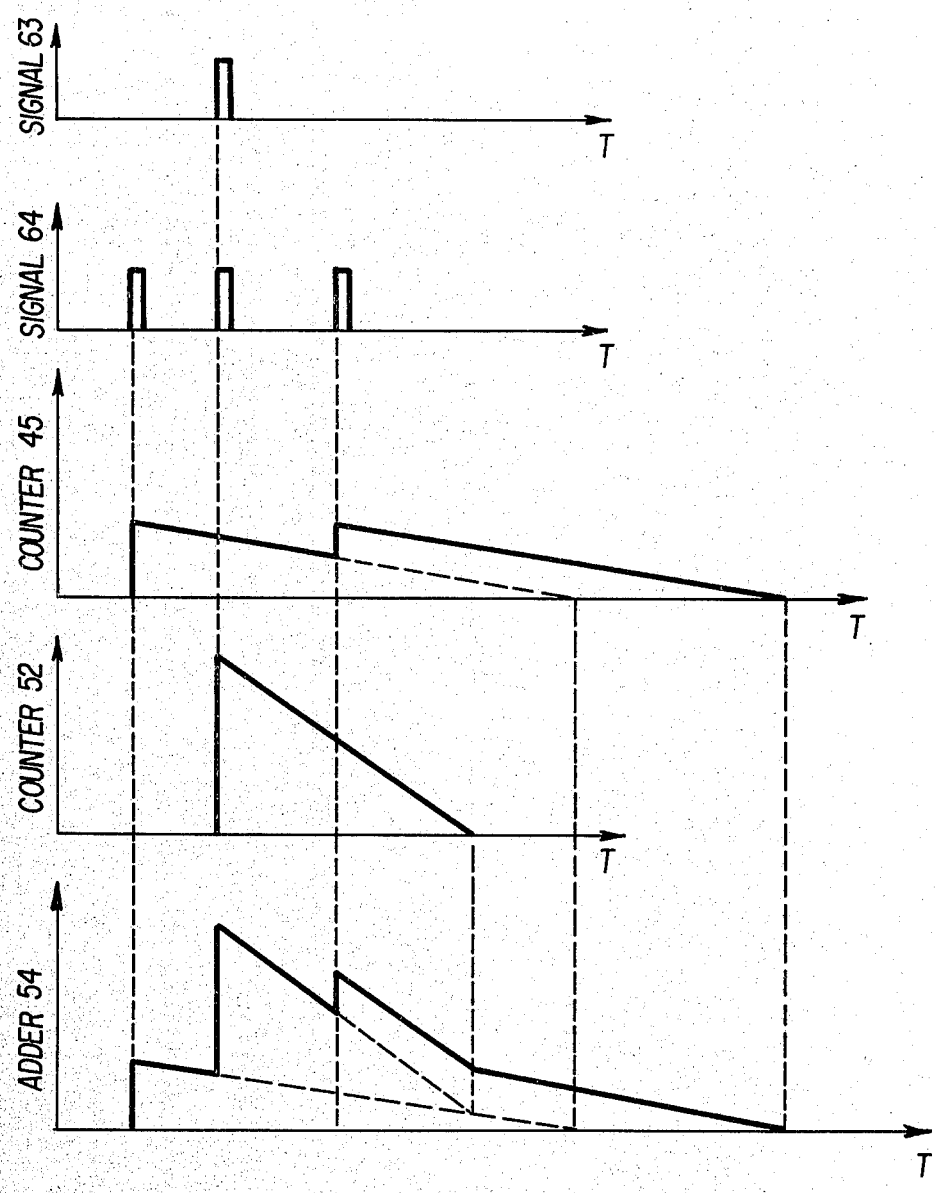
FIG. 4 is a timing diagram of the various signals present in the decrementing calculator.

FIG. 4 shows a timing diagram of the various signals present in the decrementing calculator illustrated in FIG. 3, that is, the output states of the ping detector on the first two lines corresponding to the respective input 63 and 64 and the state of the two counters 45, 52 on the following two lines. These two counters are preset to the value programmed in the associated register, respectively 46 and 53, at each impulse from the plug detector. The last line in FIG. 4 represents the adder state 43, that is, the form of the signal corresponding to the decrementing value, which is transmitted on the conductor 54 towards the angle advance calculator module.

Obviously, numerous modifications and variations of the present invention are possible in light of the above teachings. It is therefore to be understood that within the scope for the appended claims, the invention may be practiced otherwise than as specifically described herein.

What is claimed as new and desired to be secured by Letters Patent of the United States is:

1. An angle of advance correction signal generator responsive to the presence of ping signals produced in a controlled ignition internal combustion heat engine of the type in which a pre-ping threshold and a ping threshold is determined and a pre-ping signal and a ping signal produced in the event that a pre-ping or a pinging condition is detected exceeding respective of said thresholds, wherein said pre-ping signal and said ping signal are produced for each cylinder of the engine taken successively in a predetermined order, comprising multiplexor means having said pre-ping and ping signals as inputs and a number of pairs of outputs corresponding to the number of engine cylinders for selecting the pre-ping and ping signals generated in respective cylinders for application to respective of said pairs of outputs;

a cylinder meter for controlling the signal selection of said multiplexor means, said cylinder meter having a first resetting input for receiving a correction signal to reset said cylinder meter, a second input for receiving a T.D.C. and B.D.C. impulse signal, and a control output applied to said multiplexor means for controlling the signal selection in accordance with the first and second inputs to said cylinder means; and, plural decrementing angle value calculators, one for each cylinder, each receiving respective outputs from said multiplexor means and said T.D.C. and B.D.C. impulse signal, for calculating and controlling the advance angle of each cylinder based on the occurrance of said pre-ping and ping signals, said calculators each then being preset with a predetermined angle value and subsequently decremented at predetermined rates by said T.D.C. and B.D.C. impulse signal.

2. A generator according to claim 1, further comprising:

said calculators each comprising, first and second circuits for processing of the respective pre-ping and ping signals provided from said multiplexor means, said first and second circuits each comprising, a storage register for storing an initial value to be decremented, a numerical counter coupled to said storage register and preset to said initial value based on the application of respective of said pre-ping and ping signals to said calculator, said counter decremented by a predetermined number of impulses of said T.D.C. and B.D.C. signal.

a programmable divider coupled to said counter and having said T.D.C. and B.D.C. impluse signal input thereto for providing a decrement signal to said counter after said predetermined number of impluses of said T.D.C. and B.D.C. signal, and a status detector for detecting when said counter is decremented to a predetermined count and for then inhibiting application of said decrement signal to said counter, and each said calculator further comprising an adder for adding the contents of the numerical counters of the first and second circuits corresponding to a respective cylinder, and an output stage coupled to an output of said adder for providing an advance angle output based on the contents of said adder.

3. A generator according to claim 2, further comprising:

each of said counters having a preset control input, and said first and second circuits each including a logical AND gate having an output coupled to the respective counter preset input, a first input coupled to the decrement signal output of the respective programmable divider, and a second input coupled to an inhibit signal produced by the status detector for inhibiting said application of said decrement signal to said counter.

4. A generator according to claim 3, further comprising:

each numerical counter being preset to the m state by the impulses corresponding to respective of the pre-ping the ping signals and being decremented every n T.D.C. and B.D.C. impulses through the respective programmable divider.

5. A generator according to claim 4 further comprising;

each first circuit of each calculator having the value of $m_1$ selected low, one $\leq m_1 \leq$ four, the value of $n_1$ selected high, $1000 \leq n_1 \leq 2000$ T.D.C. and B.D.C. impulse signals, and each second circuit of each calculator having the value of $m_2$ is selected high, $6 \leq m_2 \leq 10$, and the value of $n_2$ selected low, $200 \leq n_2 \leq 400$ T.D.C. and B.D.C. impulse signals.

6. A generator according to any of claims 1, 2, 3, 4 or 5, further comprising;

each angle value calculator relative to a respective cylinder being followed by a respective output stage.

7. A generator according to any of claims 1, 2 or 3, further comprising;

said plural numerical calculators corresponding to respective cylinders being connected by respective outputs to a first input of an output stage, which receives at a second input the control output present at the output of the cylinder meter.

8. A generator according to claim 6 further comprising:

each output stage being a parallel/series transformation stage.

9. A generator according to claim 7, further comprising:

each output stage being a parallel/series transformation stage.

10. A generator according to claim 7, wherein each output stage further comprises:

a series connection of a memory, a numerical counter, a state detector and a logical AND gate having a first input connected to an output of said state detector, a second input connected to a conductor carrying clock signals and an output connected to a preset input of said numerical counter in said series connection.

11. A generator according to claim 8, wherein each output stage includes a respective memory for each of said calculators.

12. A generator according to claim 9, wherein each output stage includes a respective memory for each of said calculators.

13. A generator according to claim 7, wherein said output stage comprises:

a memory.

* * * * *

UNITED STATES PATENT AND TRADEMARK OFFICE
CERTIFICATE OF CORRECTION

PATENT NO. : 4,366,792

DATED : January 4, 1983

INVENTOR(S) : Robert Deleris

It is certified that error appears in the above-identified patent and that said Letters Patent is hereby corrected as shown below:

On the title page

Please insert the Foreign Application Priority Data as follows:

[30] -- Foreign Application Priority Data

November 9, 1979 [FR] France.....79/27683 --

Signed and Sealed this

Twenty-ninth Day of March 1983

[SEAL]

Attest:

GERALD J. MOSSINGHOFF

Attesting Officer

Commissioner of Patents and Trademarks